United States Patent
Schwender et al.

[11] 3,857,873
[45] Dec. 31, 1974

[54] 3-HYDROXY-5-(3-(SUBSTITUTED-AMINO)-2-HYDROXYPROPOXY)-BENZYL ALCOHOLS

[75] Inventors: Charles F. Schwender, Lebanon; John Shavel, Jr., Mendham, both of N.J.

[73] Assignee: Warner-Lambert Company, Morris Plains, N.J.

[22] Filed: Feb. 11, 1974

[21] Appl. No.: 441,597

[52] U.S. Cl. .................. 260/471 R, 260/247.2 B, 260/247.7 C, 260/293.81, 260/293.84, 260/519, 260/570.7, 424/248, 424/267, 424/309, 424/319, 424/330

[51] Int. Cl. .................................. C07c 101/42

[58] Field of Search ............. 260/471 R, 519, 570.7

[56] References Cited
UNITED STATES PATENTS
3,793,365  2/1974  Winter et al. .................. 260/519

Primary Examiner—Lorraine A. Weinberger
Assistant Examiner—L. A. Thaxton
Attorney, Agent, or Firm—Albert H. Graddis; Frank S. Chow; George M. Yahwak

[57] ABSTRACT

The present invention relates to novel compounds of the formula:

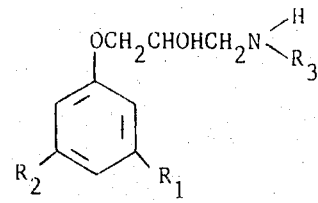

wherein $R_1$ may be a COOH, COOCH$_3$, or CH$_2$OH radical, $R_2$ may be a hydroxy or benzyl radical, and wherein $R_3$ may be a tert. butyl or a 3,4-dimethoxyphenyl ethyl radical. These agents are useful in the treatment of cardiovascular disorders such as angina pectoris, arrhythmias and hypertension wherein β-adrenergic blockage is the desired effect. Also disclosed is the preparation of the above series of β-adrenergic blocking agents. The β-adrenergic blockage characteristic of these compounds is furthermore achieved at dosage levels which are less toxic than most other β-adrenergic blocking agents.

11 Claims, No Drawings

3-HYDROXY-5-(3-(SUBSTITUTED-AMINO)-2-HYDROXYPROPOXY)-BENZYL ALCOHOLS

Compounds of the present invention are those of the family of compounds encompassed by the formula:

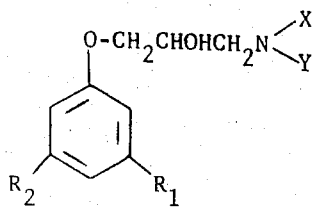

A wherein $R_1$ may be a COOH, $COOCH_3$, $CH_2OH$ radical; $R_2$ may be a hydroxy or benzyloxy radical; and wherein X and Y may be, together or separately, hydrogen, a lower alkyl of up to six carbons, tert.-butyl or a cyclic alkyl such as cyclopentyl, an aralkyl such as phenylethyl, or benzyl, or a lower alkyl of up to six carbons substituted with an hydroxy or amino radical. X and Y may further be joined together to form heterocyclic structures such as a morpholino or piperidino group.

More particularly, compounds of the formula:

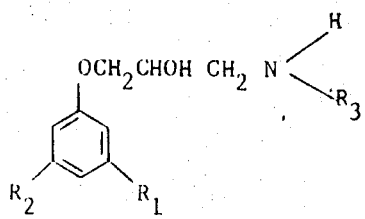

B wherein $R_1$ is selected from the group consisting of:
—COOH,
—$COOCH_3$, and
—$CH_2OH$;
wherein $R_2$ is selected from the group consisting of:
—OH, and

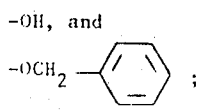

wherein $R_3$ is selected from the group consisting of:

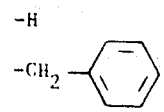

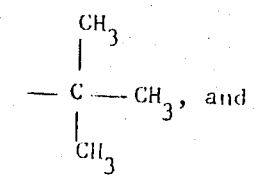, and

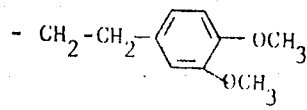

and the pharmaceutically acceptable salts of the above compound are particularly useful in the treatment of those cardiovascular disorders such as angina pectoris, arrhythmias, and hypertension. The $\beta$-adrenergic blockage characteristic of these compounds is achieved at dosage levels which are much less toxic than most other $\beta$-adrenergic blocking agents.

Suitable esters of the above compounds with the usual pharmaceutically acceptable alcohols and acids also have utility. Among these are acetate, succinate, propionate, benzoate, and the like, as well as modifications of the oxypropanolamino side chain to the corresponding oxazolidinyl derivatives.

Pharmaceutically acceptable salts, such as hydrogen chloride and fumarate, of the above compounds have also been shown to have utility as $\beta$-adrenergic agents.

The preferred species of this invention include those analogs of formula A shown in formula B. Generally speaking, the preferred species of compounds were synthesized starting from the known precursor, methyl-3,5-dihydroxybenzoate (formula I) as follows:

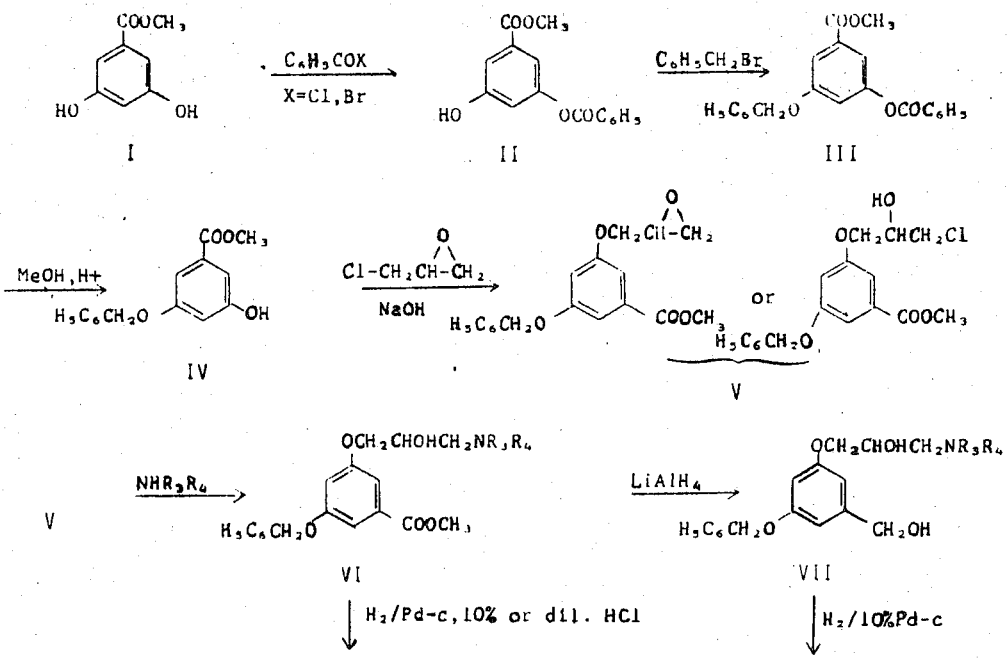

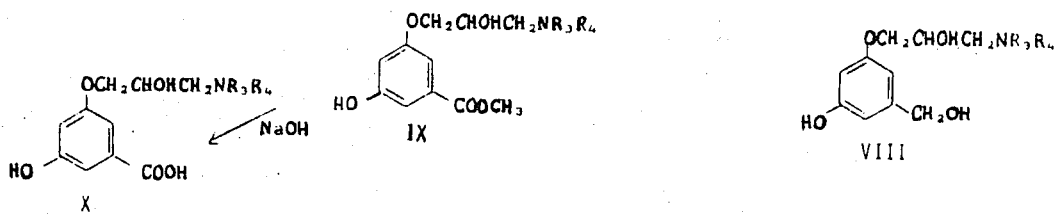

As shown in the preceding flow diagram, reaction of formula I with one equivalent of benzoyl halide gives the corresponding methyl 3-benzoyloxy-5-hydroxybenzoate (II) which is then benzylated using benzyl bromide to give methyl 3-benzyloxy-5-benzoyloxybenzoate (III). A transesterification of III using MeOH and an acid catalyst such as ethanesulfonic acid gives methyl 3-benzyloxy-5-hydroxy-benzoate (IV). Reaction of IV with epichlorohydrin in methanol containing a base such as NaOH give the intermediate methyl 3-benzyloxy-5-[2,3-epoxypropoxy and/or 3-chloro-2-hydroxypropoxy] benzoate (V) which is further reacted with the appropriate amine such as tert-butylamine. The compound obtained, methyl 3-benzyloxy-5-[3-(substituted-amino)-2-hydroxypropoxy] benzoate (VI) is reduced with LiAlH₄ and gives 3-benzyloxy-5-[3-(substituted-amino)-2-hydroxypropoxy]-benzyl alcohol as product, VIII. Alternatively, debenzylation of VIII with acid gives methyl 3-hydroxy-5-[3-(substituted-amino)-2-hydroxypropoxy]-benzoate, IX, which is treated with NaOH to yield the benzoic acid product X.

More specifically, the following examples outline the procedures used in the preparation of the compound of this invention.

EXAMPLE 1

METHYL 3-BENZOYLOXY-5-HYDROXYBENZOATE

To a solution of 168 g (1.0 mole) of methyl 3,5-dihydroxy-benzoate in 2.0 l. of water was added 30 ml of 10% NaOH until a pH of 8.0. Benzoyl chloride (154 g, 1.1 moles) and 400 ml of 10% NaOH were added simultaneously to the warmed reaction mixture (40°) over a 30 minute period. The reaction was stirred at 30°–35° for 1 hour and extracted with CHCl₃ (2×750 ml). The combined CHCl₃ extracts were washed with water (1×350 ml) and dried over MgSO₄. Evaporation of the CHCl₃ gave 252 g (92.8%) of the crude product. Recrystallization of the material from benzene gave 159 g (58.5%) of crystalline product; mp 110°–112°.

EXAMPLE II

METHYL 3-BENZOYLOXY-5-BENZYLOXYBENZOATE

A mixture of methyl 3-benzoyloxy-5-hydroxybenzoate [418 g (1.54 moles)], benzyl bromide (387 g, 2.26 moles), K₂CO₃ (310 g, 2.26 moles) and 4.1 l. of acetone was heated at reflux for 3 hours. The mixture was poured onto 3.3 l. ice and extracted with CHCl₃ (2×2 l.). The CHCl₃ extracts were combined and washed with 10% NaOH (3.3 l.) and water (2×1.6 l.). The CHCl₃ phase was dried with MgSO₄ and evaporated to give an oily residue which was stirred with hexane (1.8 l.) at 10° for 1 hour. Crystalline product was collected by filtration and reslurried with hexane (1.3 l.) for 1 hour at 10°. The crystalline material was collected and dried to give 409 g (73.5%) of product; mp 69–70°.

EXAMPLE III

METHYL 3-BENZYLOXY-5-HYDROXYBENZOATE

A reaction mixture containing 409 g (1.13 moles) of methyl 3-benzoyloxy-5-benzyloxybenzoate, 102 g (0.55 mole) p-toluenesulfonic acid and 2.7 l. of MeOH was heated at reflux for 17 hours. The reaction mixture was evaporated to dryness and the crude residue obtained was dissolved in CHCl₃ (2.5 l.) and washed with aqueous NaHCO₃, water and dried with MgSO₄ before the CHCl₃ phase was evaporated in vacuo to the crude product as an oil. Trituration of the residue with hexane yielded crystalline product; yield 220 g (75.5%); mp 97°–98°.

Anal. Calcd for C₁₅H₁₄O₄: C, 69.75; H, 5.46. Found: C, 69.85; H, 5.42.

EXAMPLE IV

METHYL 3BENZYLOXY-5-(2,3-EPOXYPROPOXY)-BENZOATE AND/OR METHYL 3-BENZYLOXY-5(3-CHLORO-2-HYDROXYPROPOXY)-BENZOATE

A methanolic solution (250 ml) containing 4.26 g (106 mmol) of NaOH, 250 ml of epichlorohydrin and 25 g (96.8 mmol) of methyl 3-benzyloxy-5-hydroxybenzoate was stirred at room temperature for 18 hours. The reaction mixture was evaporated to a residual oil which was dissolved in 500 ml CHCl₃ and extracted with 10% NaOH (1×100 ml) and water (1×100 ml) before drying with anhydrous MgSO₄. The CHCl₃ was evaporated and the crude mixture of the expected products was obtained as a gum in 98% yield.

EXAMPLE V

METHYL 3-BENZYLOXY-5-[3-(3,4-DIMETHOXYPHENYLETHYLAMINO)-2-HYDROXY-PROPOXY]-BENZOATE

A reaction mixture containing 10.0 g (31.9 mmol) of methyl 3-benzyloxy-5-[2,3-epoxypropoxy or 3-chloro-2-hydroxypropoxy]-benzoate, 25 g (138 mmol) of 3,4-dimethoxyphenylethylamine and 100 ml of methanol was heated at reflux for 1 hour. Evaporation of the reaction mixture gave a residual oil which was dissolved in CHCl₃ (500 ml), extracted with 1N HCl (2×250 ml), 1N NaOH (500 ml), and dried with anhydrous MgSO₄. Evaporation of the CHCl₃ gave a residual solid which upon trituration with a Et₂O-hexane mixture gave 14.6 g (92.4%) of crystalline product; mp 75°–85°. The analytical material was obtained by recrystallization from toluene; mp 94°–95°.

Anal. Calcd for C₂₈H₂₃NO₇: C, 67.86; H, 6.71; N, 2.83. Found: C, 67.66; H, 6.75; N, 2.65.

EXAMPLE VI

3-[3-(t-BUTYLAMINO)-2-HYDROXYPROPOXY]-5-HYDROXYBENZYL ALCOHOL FUMARATE

An ethanol solution (250 ml) containing 19.7 g (54.7 mmol) of 3-benzyloxy-5-(3-t-butylamino-2-hydroxypropoxy)-benzyl alcohol was hydrogenated over 8 g of 10% Pd/C catalyst until hydrogen uptake had ceased. The catalyst was removed by filtration through a celite pad and the filtrate obtained was evaporated to a gummy residue. A crystalline fumarate salt was obtained in analytical purity from MeOH/Et$_2$O, mp 254°–255° (dec).

Anal. Calcd for $C_{14}H_{23}NO_4 \cdot \frac{1}{2} C_4H_4O_4$: C, 58.70; H, 7.70; N, 4.28. Found: C, 58.60; H, 7.44; N, 4.13.

EXAMPLE VII

3-BENZYLOXY-5-[3-(t-BUTYLAMINO)-2-HYDROXPROPOXY]-BENZYL ALCOHOL

To a suspension of 29.1 g (68.5 mmol) of methyl 3-benzyloxy-5-(3-t-butylamino-2-hydroxypropoxy)benzoate in 500 ml of THF cooled at 0°, was added 5.20 g (137 mmol) of LiAlH$_4$. The resultant mixture was refluxed 18 hours. After the excess LiAlH$_4$ and complex had been destroyed by the addition of water, the reaction mixture was diluted with 500 ml of CHCL$_3$ and the precipitate was removed by filtration. The organic filtrate was washed with water (1×500 ml), dried with MgSO$_4$ and evaporated to give the crude solid product; yield 20.7 g mp 99°–105°. The analytical sample was obtained from cyclohexane, mp 105°–107°.

Anal. Calcd for $C_{21}H_{29}NO_4$: C, 70.17; H, 8.13; N, 3.90. Found: C, 70.18; H, 8.01; N, 4.00.

EXAMPLE VIII

METHYL 3-BENZYLOXY-5-[3-(t-BUTYLAMINO)-2-HYDROXYPROPOXY]-BENZOATE HYDROCHLORIDE

A reaction mixture containing 29.9 g (94.8 mmol) of methyl 3-benzyloxy-5-(2,3-epoxypropoxy or 3-chloro-2-hydroxypropoxy)-benzoate and 250 ml of t-butylamine dissolved in 250 ml of methanol was heated at reflux for 1 hour. After evaporation of the volatile components of the reaction mixture, the oily residue which remained was converted to a crystalline hydrochloride salt; yield 30.2 g; mp 174°–176°. Recrystallization of the product from toluene gave the analytical sample; mp 181°–183°.

Anal. Calcd for $C_{22}H_{29}NO_5 \cdot HCl$: C, 62.33; H, 7.13; N, 3.30; Cl, 8.36. Found: C, 62.45; H, 7.25; N, 3.50; Cl, 8.33.

EXAMPLE IX

3-[3,4-DIMETHOXYPHENYLETHYLAMINO)-2-HYDROXYPROPOXY]-5-HYDROXYBENZYL ALCOHOL FUMARATE

To a suspension of 3.11 g (82.0 mmol) of LiAlH$_4$ in 250 ml of dry tetrahydrofuran, was added a THF solution (250 ml) containing 20.3 g (41.0 mmols) of methyl 3-benzyloxy-5-[3-(3,4-dimethoxyphenylethylamino)-2-hydroxypropoxy]-benzoate. The resulting reaction mixture was refluxed for 3 hours before excess LiAlH$_4$ and complex was destroyed by the careful addition of water. The white precipitate which formed was removed by filtration and the filtrate obtained was evaporated in vacuo and gave a quantitative yield of the crude 3-benzyloxy-5-[3-(3,4-dimethoxyphenylethylamino)2-hydropropoxy]-benzyl alcohol as a straw colored oil.

An ethanol solution (150 ml) containing 19.6 g (41.2 mmols) of 3-benzyloxy-5-[(3,4-dimethoxyphenylethylamino)-2-hydroxypropoxy]-benzyl alcohol was hydrogenated over 5.0 g of 10% Pd/C catalyst until hydrogen uptake had ceased. The catalyst was removed by filtration and the filtrate was evaporated to give an oily residue as product. A crystalline hemifumarate salt was obtained from 1-propanol; yield 14.1 g, mp 183°–186° dec. The analytical sample was obtained by one recrystallization from methanol-ether; mp 189°–191° dec.

Anal. Calcd for $C_{20}H_{27}NO_6 \cdot \frac{1}{2} C_4H_4O_4$: C, 60.68; H, 6.71; N, 3.22. Found: C, 60.60; H, 6.87; N, 3.45.

EXAMPLE X

METHYL 3-[3-(t-BUTYLAMINO)-2-HYDROXYPROPOXY]-5-HYDROXYBENZOATE FUMARATE

Methanol, saturated with hydrogen chloride was refluxed with 2.0 g (4.72 mmol) of methyl 3-benzyloxy-5-[3-(t-butylamino)-2-hydroxypropoxy]benzoate for 18 hours. The mixture was evaporated to a gummy residual HCl salt which would not crystallize. The residue was partitioned between CHCL$_3$ (100 ml) and dilute NH$_4$OH (100 ml). The CHCL$_3$ phase was separated, dried with anhydrous MgSO$_4$ and evaporated to give the free base product as an oil. A crystalline fumarate salt was obtained; yield 1.13 g (67.3%) mp 251°–252° dec. The analytical sample was obtained from MeOH/Et$_2$O, mp 259°–260° dec.

Anal. Calcd for $C_{15}H_{23}NO_5 \cdot \frac{1}{2} C_4H_4O_4$: C, 57.45; H, 7.09; N, 3.94. Found: C, 57.26; H, 7.15; N, 3.75. 3-[3-(3,4-dimethoxyphenylethylamino)-2-hydroxypropoxy]-5-hydroxybenzyl alcohol, prepared as in Example IX, was tested for determining β-adrenergic receptor agonist/antagonist evaluation in the ganglion blocked or reserpinized dog. The dosage necessary to block the isoproterenol (0.3 μg/kg, i.v.) response was tested for both myocardial (Beta$_1$) and peripheral (Beta$_2$) blood force; dosages showing intrinsic sympathomimetric activiity and direct myocardial depression were also determined. The ganglion blockage was accomplished by treating the dogs prior to testing with 2 mg/kg of ansolysen or reserpine. The results are found in Table 1.

This testing showed the Example IX compound to be a potent and competitive β-adrenergic receptor antagonist. It has intrinsic sympathomimetic activity at doses causing minimal Beta blockage. Example A compound is a cardioselective β-adrenergic blocker i.e., there appears to be about a 3-fold difference in the dose blocking Beta$_1$ and Beta$_2$ receptors. Furthermore it is less cardiodepressant than propanolol with only minimal depressant activity at doses up to 30 mg/kg. After a cardiodepressant dose of propranolol (10 mg/kg on top of a total of 14.4 mg/kg of test compound, an additional 10 mg/kg of test compound caused no further direct myocardial depression.

TABLE I

Beta Blocker Evaluation in the Vagotomized Dog Of Compound Example IX

| Expt. | Pretreatment | Dose, mg/kg, i.v., necessary to block the Isoproterenol (0.3 μg/kg, i.v.) Response | | Intrinsic Sympathomimetic Activity mg/kg | Dose, mg/kg Causing Direct Myocardial Depression |
|---|---|---|---|---|---|
| | | Beta, (Myocardial) Force and Rate | Beta₂ (Peripheral Vasculature) Diastolic Blood Pressure | | |
| 1 | Ansolysen | 0.3 – 1.0 | 1.0 | <0.03 | 10 – 30 (slight) |
| 2 | Ansolysen | 0.3 – 1.0 | >1.0 | <0.03 | 10 (slight) |
| 3 | Ansolysen | 0.3 – 1.0 | 3.0 | <0.03 | 10 (slight) |
| 4 | Reserpine | 1.0 | >3.0 | <0.03 | 10 (slight) |

The compound was also tested for ouabain-induced arrhythmia in which 2 mg/kg of the test compound are given I.V. After any effects have been observed for 15-30 minutes, ouabain is given I.V. until the appearance of ventricular tachycardia. After arrhythmia has developed, 5 mg/kg of test compound are administered and the effects observed. Results showed that the compound was devoid of antiarrhythmic activity.

3-[3-(tert-butylamino)-2-hydroxypropoxy]-5-hydroxybenzyl alcohol, prepared as in Example VI, was tested for an evaluation of its direct myocardial depressant activity as compared with the known Beta receptor antagonist propranolol.

Standard laboratory procedures were followed. In addition a segment of the circumflex coronary artery of the dog was isolated and partially occuluded so as to depress myocardial contractility by approximately 50% (contractile force was measured using the Walton Brodie Strain Gauge). Following stabilization of the preparation equiactive i.v. doses of the antagonists were administered: the test compound (0.5 mg/kg) and propranolol (1.0 mg/kg). Doses of each compound were repeated and administered in a random fashion.

The test compound did not depress myocardial contractility in addition to the depression caused by coronary occulsion alone. Propranolol had a negative inotropic action after 1.0 mg/kg. The test compound was negatively inotropic at 2.0 mg/kg.

The test compound caused less of a negative inotropic response than propranolol at equiactive Beta blocking doses, and did not appear to have any intrinsic sympathomimetic properties in the ganglion blocked dog.

A summary of the pharmcology of the two compounds tested above can be seen in the following Table II:

TABLE II

| Compound | Dose* (mg/Kg, iv.) to Totally Block Myocardial Response to Isoproterenol | Dose (mg/Kg, iv.) Causing Direct Myocardial Depression |
|---|---|---|
| Propranolol | 0.3 – 1 mg | 0.5 mg |
| Example VI | 0.1 – 0.3 mg | 2 mg (slight) |
| Example IX | 0.3 – 1.0 mg | 10 – 30 mg (slight) |

*Dose, mg/Kg, iv., necessary to totally block heart response to isoproterenol 0.3 μg/Kg, iv. in dog (vagotomized and ganglionic blocked by ansolysen).

Specifically, the analog where $R_1$=CH₂OH, $R_2$=H, and $R_3$=t-butyl (Example VI) elicits potent β-adrenergic blocking activity while having less toxic cardiodepressant action than propranolol. A dose of 0.1–1.0 mg/Kg, iv. is required to totally block the β-adrenergic response due to isoproterenol (0.3 μg/kg, iv.) administered in anesthetized, reserpinized, vagotomized adult mongrel dogs.

A second analog of this invention where $R_1$=CH₂OH, $R_2$=H, and $R_3$=3,4-dimethoxyphenylethyl (Example IX) demonstrates potent β-adrenergic blocking activity which is selective for the β-receptors of the myocardium compared with peripheral vascular β-receptors. Generally, a dose of 0.1–3.0 mg/kg, iv. is required to totally block the myocardial response to isoproterenol(0.3 μg/kg, iv.) administered in anesthetized, reserpinized, vagotomized adult mongrel dogs. This analog has possible advantage over other cardioselective β-adrenergic blockers such as practolol since it is a more potent cardioselective agent with low toxicity.

The cardioselective β-adrenergic blocking agents of this invention are therapeutically preferred over nonselective β-blockers in cases where patients are suffering from bronchial constriction due to asthma or similar conditions. Non-selective β-blockers would be expected to aggravate bronchial constriction under those conditions.

Accordingly we claim:

1. A compound of the formula:

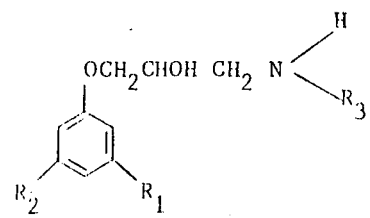

wherein $R_1$ is selected from the group consisting of:
— COOH,
— COOH₃, and
— CH₂OH;

wherein $R_2$ is selected from the group consisting of:
— OH, and

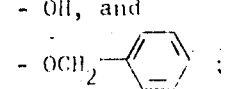

wherein $R_3$ is selected from the group consisting of:
— H

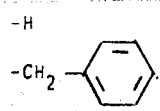

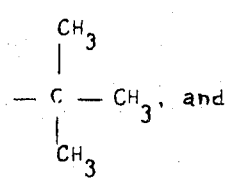

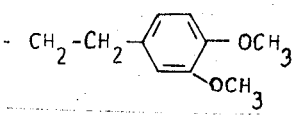

and the pharamceutically acceptable salts of the above compound.

2. The compound according to claim 1 wherein $R_1$ is —CH$_2$OH; $R_2$ is —OH; and $R_3$ is

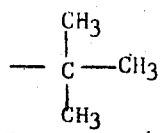

3. The compound according to claim 1 wherein $R_1$ is —CH$_2$OH; $R_2$ is —OH; and $R_3$ is

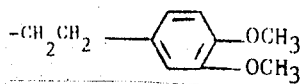

4. The compound according to claim 1 wherein $R_1$ is —COOCH$_3$; $R_2$ is —OH; and $R_3$ is

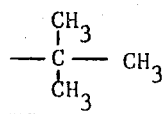

5. The compound according to claim 1 wherein $R_1$ is —CH$_2$OH; $R_2$ is

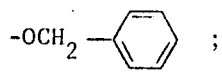

and $R_3$ is

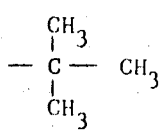

6. The compound according to claim 1 wherein $R_1$ is —COOCH$_3$; $R_2$ is

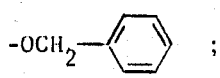

and $R_3$ is

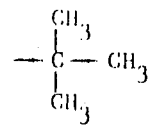

7. The compound according to claim 1 wherein $R_1$ is —COOCH$_3$; $R_2$ is

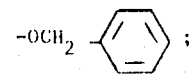

and $R_3$ is

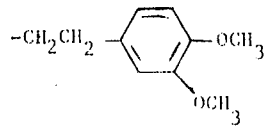

8. The compound according to claim 1 wherein $R_1$ is CH$_2$OH; $R_2$ is

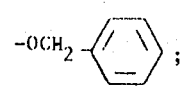

and $R_3$ is

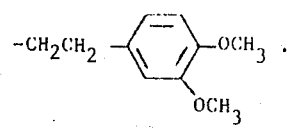

9. The compound according to claim 1 wherein $R_1$ is —COOCH$_3$; $R_2$ is

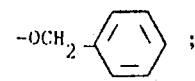

and $R_3$ is

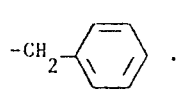

10. The compound according to claim 1 wherein $R_1$ is —CH$_2$OH; $R_2$ is

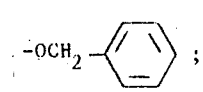

and $R_3$ is

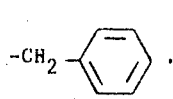

11. The compound according to claim 1 wherein $R_1$ is —CH$_2$OH; $R_2$ is —OH; and $R_3$ is —H.

* * * * *